3,111,408
PROTEIN FOOD COMPOSITION AND METHOD

Francis M. Y. Cheng and Margaret J. Neibling, Minneapolis, Minn., assignors to The Pillsbury Company, Minneapolis, Minn., a corporation of Delaware
No Drawing. Filed Sept. 12, 1960, Ser. No. 55,183
8 Claims. (Cl. 99—14)

This invention relates to food products and particularly to a proteinaceous product of rigid, aerated structure which, unlike previous such products, is possessed of sufficient structural strength to permit its utilization as a shell for the service of main or dessert dishes which may be either hot or cold.

The food art has long desired to have a light, low density meringue-like product capable of providing a serving shell, or the like, for such uses as the service of hot main dishes. However, the meringue and meringue-like products of the prior art have not been capable of fulfilling this function for the reason, among others, that such prior art products will collapse and disintegrate when they are covered or filled with such items as ice cream or creamed chicken. Hence the food art has found it necessary to employ less desirable compositions in the production of serving shells and the like as, for example, pie crusts and puff pastries which though characterized as being light are, relative to a meringue, really quite heavy.

The present invention contemplates a food composition having substantially the same composition and properties as a meringue and having, in addition, sufficient structural strength to support other foods without being collapsed or disintegrated thereby.

Further, it has been discovered that the product of the present invention may be formulated to provide a wide variety of very delectable food items as, for example, light crunchy snack items of various sizes, flavors and shapes.

In general the product of the present invention comprises an oil-in-protein dispersion wherein a continuous, aerated, proteinaceous external phase physically entraps and retains a dispersed, discontinuous edible fat or oil, internal phase. The process of the present invention comprises, generally, the steps of whipping a protein composition into a stiff foam, dispersing an edible oil therein, and drying the resultant dispersion to cause the dispersed oil phase to become retainingly entrapped within the continuous, proteinaceous foam phase. The drying step is preferably conducted at elevated temperatures to heat-set the proteinaceous phase and facilitate the removal of water.

More particularly, it has been discovered that relatively large quantities of oil or fat may be dispersed in a proteinaceous film-forming foam, notwithstanding the fact that the initial act of producing the foam necessitates the exclusion of fats or oils. It has also been discovered that when a proteinaceous film-forming foam, containing a dispersed oil phase, is properly dried, the foam will form into a continuous aerated film and become remarkably "strong" and will not be collapsed when employed as a serving shell for creamed chicken or the like. Yet surprisingly enough, it has been found that when a portion of the dried dispersion is eaten out-of-hand it will literally "melt in your mouth."

In carrying out the present invention, it has been found essential to employ soy protein and, it has been found convenient, though not essential, to employ an admixture of egg albumen, soy protein and a whipping aid as the protein composition. Any of the conveniently available edible oils may be employed and any convenient means may be employed to foam the protein compositions and to subsequently disperse the oil constituent therein. Likewise, the drying operation may be accomplished in any convenient manner so long as the temperature-time effect is such that it will not scorch the proteinaceous continuous phase and/or boil or excessively volatilize the discontinuous oil phase. If the protein composition employed is in dry form it must of course be properly hydrated before foaming, and hydration and foaming may of course be carried out in one operation. Further, where a soy protein is to be included, it has been found that the modified soy protein composition disclosed and claimed in United States Patent No. 2,844,468, issued July 22, 1958, to Robert C. Gunther and entitled Soy Protein Whipping Compositions and Process for the Preparation Thereof, will provide excellent results. When a whipping aid is to be employed, any of several may be selected including triacetin, triethyl citrate or sodium-hexametaphosphate any of which may be successfully utilized in accordance with the methods established therefor.

After the protein composition has been selected, it is then hydrated and/or foamed, as by whipping, until it will form a stiff peak, i.e., withdrawal of a spoon or the like from the whipped mass will cause a portion thereof to extend into an upstanding stiff peak. A quantity of an edible oil is then added to the foam which is again whipped until visual observation satisfies the operator that there has occurred an adequate particlization and dispersion of the oil in the proteinaceous constituent and the oil-in-protein dispersion has a specific gravity of from about .08 to about .45. At this point the oil-in-protein dispersion will be in a relatively viscous physical condition but will look much like an ordinary meringue to the casual observer. In this condition, the dispersion will be sufficiently pliable to permit shaping, as by molding, if it is desired to provide the final product with a particular configuration. Following formation of the dispersion and shaping, if such be desired, the still-pliable oil-in-proteinaceous-foam is then conveniently dried, as for example, in an oven with or without vacuum, care being taken not to scorch or burn the product or to "explode" it by excessive expansion or volatilization of the water and/or oil contained therein, and whatever means are employed for drying of the product, the drying operation may be deemed completed when the product develops what may be easily visually observed as a hard crustaceous skin after which point the product should be conveniently cooled before packaging and/or utilization.

To further facilitate an understanding of the present invention there are given hereinafter several illustrative eexamples of specific embodiments thereof, which examples are given as being merely typical of the invention and are in no event to be construed as limiting the scope of the invention itself.

Example 1

Using the formula:

| | Percent |
|---|---|
| Soy protein [Gunther D-400 brand; see U.S. Patent No. 2,844,468 cited supra] | 5.30 |
| Egg algumen, dried | 2.48 |
| Sugar [sucrose] | 5.33 |
| Corn oil [food grade, non-hydrogenated] | 26.53 |
| Water | 60.36 | product embodying the present invention was prepared by admixing the dry egg albumen, soy protein and sugar and blending the admixture into the water with a Hobart N-50 mixer running at speed 2 for one minute. At the end of this initial one-minute blending period, the purpose of which was to initiate hydration and foaming of the dry ingredients, the mixer was then shifted to speed 3 for thirty seconds to bring the foam to a "stiff peak." Then the speed was again set at 2 for a period of 15 seconds while the oil was poured into the foam. Once all of the oil was thus introduced, the mixer was again shifted to speed 3 for an additional thirty seconds to accomplish dispersion of the oil in the foam and thereby produce an oil-in-protein-foam dispersion. Aliquots of the dispersion were then molded to provide pie-shell-shaped receptacles after which they were dried in a household oven at 300° F. for 60 minutes.

The dried shells thus produced were then conveniently cooled by permitting them to stand at room temperature after which they were successfully employed as serving shells for both creamed chicken and ice cream and were judged by an evaluation panel of food experts to be excellent in all respects including quality, flavor and appearance.

*Example II*

Using the formula:

|   | Percent |
|---|---|
| Soy protein [same as Example I] | 12.22 |
| Egg albumen [same as Example I] | 5.72 |
| Sugar [same as Example I] | 12.29 |
| Hydrogenated cottonseed oil | 22.23 |
| Water | 47.54 | product embodying the invention was prepared in accordance with the procedure of Example I but was not molded. Instead of being molded aliquots of the dispersion were simply spooned onto a cookie sheet for drying, and were then dried in a commercial oven at 225° F. for 30 minutes.

The products thus formed were then subjected to evaluation by a panel of food experts who were asked to judge whether they were satisfactory as a snack item for "eating-out-of-hand" and it was the judgement of the panel that the products made a very excellent snack item in all respects. Further it was particularly reported that the products submitted had a surprisingly superior "mouth-feel" in that unlike prior meringues and meringue-like products, the product of the instant invention did not become gummy or sticky when placed in the mouth.

*Example III*

Using the formula:

|   | Percent |
|---|---|
| Soy protein [same as Example I] | 5.64 |
| Egg albumen [same as Example I] | 2.64 |
| Sugar [same as Example I] | 5.67 |
| Corn oil | 64.12 |
| Water | 21.93 | product embodying the invention was prepared in the same manner as the product of Example II. The product so produced was then evaluated in the same manner as was the product of Example II and given the same excellent report with the added note that the product was more compact than the product of Example II and had a texture and eating quality similar to a malt ball.

Product has also been prepared utilizing variations in formula of from:

5% to 20% soy protein
2% to 14.5% albumen (or substitute)
2% to 25% sugar
4% to 64% oil
20% to 60% water and the results have in every instance been totally successful.

Moreover our experiments with the instant invention have demonstrated that any edible substance capable of being aerated or otherwise gasified to provide a viscous, pliable mass having a continuous cellular phase capable of being gelled or set, may be utilized in lieu of the egg albumen of the foregoing examples. Thus such other substances as carboxy-methyl-cellulose, pectin, wheat germ and starch may if desired, be substituted in the film-forming constituent. Of course the only limitation upon the oil constituent is that it be edible. Further, the addition of such ancillary ingredients as flavor and/or color is entirely optional and they may be utilized as desired.

Thus while there are given herein several specific illustrations of various embodiments of the invention, it will readily be seen that the invention itself is of much broader scope than the embodiments which have been illustrated. Hence the specific embodiments recited in the examples may not be construed so as to limit the scope of the invention itself.

What I claim is:

1. A food composition consisting of an oil composition-in-protein composition dispersion comprising; a continuous, external phase formed of an aerated, film-forming, soy-protein composition; and a discontinuous, internal phase formed of an edible oil dispersed within and retainingly entrapped by said continuous phase.

2. A food composition consisting of an oil composition-in-protein composition dispersion comprising; a continuous, external phase formed of a foamed, heat-set, soy-protein composition; and a discontinuous, internal phase formed of an edible oil composition dispersed within and retainingly entrapped by said continuous phase.

3. A food composition consisting of an oil composition-in-protein composition dispersion comprising; a continuous, external phase comprising a dried soy-protein foam composition of cellular structure; a gas contained within cells of said continuous phase; and a discontinuous, internal phase formed of an edible fat composition; said fat composition being in particlized condition and dispersed within and retainingly entrapped by said continuous phase.

4. The composition of claim 3 wherein said proteinaceous composition comprises an admixture of egg albumen, soy protein, and a whipping composition selected from the group consisting of: sodium-hexametaphosphate, triacetin and triethylcitrate.

5. The composition of claim 3 wherein said edible oil comprises an edible vegetable oil.

6. The method of making a proteinaceous food composition consisting of an oil composition-in-protein composition dispersion, said method comprising the steps of; aerating an aqueous soy-protein composition to produce a stiff foam therefrom; admixing said stiff foam with an edible oil; agitating said admixture to disperse and distribute said oil throughout said foam; and heating said admixture to retainingly entrap globules of said oil within said foam.

7. The method of making a proteinaceous food composition consisting of an oil composition-in-protein composition dispersion, said method comprising the steps of; whipping an aqueous composition comprising egg albumen, soy protein and a whipping agent to convert said admixture into a stiff foam; admixing and agitating said stiff foam together with an edible oil composition to produce a continuous, external, proteinaceous phase and a discontinuous dispersed oil phase; and drying said admixture to retainingly encase said dispersed oil composition within said continuous phase.

8. A food product consisting of an oil-in-protein dispersion, said dispersion comprising;
a foamed, continuous, heat-set soy protein material having a crustaceous outer skin and an inner porous body;
and a discontinuous edible oil material retainingly entrapped within said protein material.

References Cited in the file of this patent

UNITED STATES PATENTS

| 2,730,447 | Boyer | Jan. 10, 1956 |
| 2,785,069 | Dudman | Mar. 12, 1957 |
| 2,913,342 | Cameron et al. | Nov. 17, 1959 |
| 2,952,544 | Durst et al. | Sept. 13, 1960 |